(12) United States Patent
Suzuki et al.

(10) Patent No.: US 11,307,023 B2
(45) Date of Patent: Apr. 19, 2022

(54) MEASUREMENT SYSTEM AND METHOD THEREOF

(71) Applicant: OMRON Corporation, Kyoto (JP)

(72) Inventors: Yuta Suzuki, Ayabe (JP); Hiroshi Sawaragi, Otsu (JP); Tomonori Kondo, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 621 days.

(21) Appl. No.: 16/223,120

(22) Filed: Dec. 18, 2018

(65) Prior Publication Data

US 2019/0271538 A1  Sep. 5, 2019

(30) Foreign Application Priority Data

Mar. 1, 2018 (JP) ............................. JP2018-036528

(51) Int. Cl.
*G01B 11/24* (2006.01)
*G05B 19/042* (2006.01)

(52) U.S. Cl.
CPC .......... *G01B 11/24* (2013.01); *G05B 19/0423* (2013.01); *G05B 2219/37117* (2013.01);
(Continued)

(58) Field of Classification Search
CPC .. G01B 11/24; G01B 11/026; G05B 19/0423; G05B 2219/37117; G05B 2219/37193;
(Continued)

(56) References Cited

U.S. PATENT DOCUMENTS 6,477,181 B1 * 11/2002 Fujimori ............... H04J 3/0632
370/476
2002/0185998 A1  12/2002 Beck
(Continued)

FOREIGN PATENT DOCUMENTS

CN    101232977    7/2008
CN    101233460    7/2008
(Continued)

OTHER PUBLICATIONS

Maki Yoshiro, JP-2016001373-A, Facility Management System, Controller, Facility Management Device, and Facility Management Method, Jan. 7, 2016, Espacenet English Machine Translation (Year: 2016).*

(Continued)

*Primary Examiner* — Alexander Satanovsky
(74) *Attorney, Agent, or Firm* — JCIPRNET

(57) ABSTRACT

A measurement system and method, which increases a degree of freedom for setting a measurement period and a transmission period of measurement values and has a high accuracy, are provided. The measurement system includes a control device and a measurement device that measures a measurement object in a first period and transmits measurement values obtained from the measurement device to the control device. The measurement device transmits the measurement values waiting to be transmitted and additional information including information of the number of the measurement values waiting to be transmitted to the control device using frames transmitted in a second period that is longer than the first period. The control device generates time series data in which the measurement values are arranged in time series using the additional information.

13 Claims, 11 Drawing Sheets

(52) U.S. Cl.
CPC ............. *G05B 2219/37193* (2013.01); *G05B 2219/37532* (2013.01)

(58) Field of Classification Search
CPC .. G05B 2219/37532; G05B 2219/1215; G05B 2219/13063; G05B 2219/37526
See application file for complete search history.

(56) References Cited

U.S. PATENT DOCUMENTS

| | | | |
|---|---|---|---|
| 2003/0223374 | A1 | 12/2003 | Hayashi |
| 2004/0167745 | A1 | 8/2004 | Suzuki |
| 2008/0307125 | A1 | 12/2008 | Hildebran |
| 2010/0094462 | A1 | 4/2010 | Sugihara et al. |
| 2010/0153065 | A1* | 6/2010 | Kawamura .......... G05B 23/024 702/179 |
| 2014/0320866 | A1* | 10/2014 | Mikoshiba .......... G01B 9/0209 356/511 |
| 2015/0058432 | A1* | 2/2015 | Mizutani .......... G05B 19/0423 709/208 |
| 2015/0183114 | A1 | 7/2015 | Takahashi et al. |
| 2015/0241871 | A1* | 8/2015 | Yoshino ............. G05B 19/4185 702/81 |
| 2018/0245987 | A1* | 8/2018 | Mizoguchi ............. G06F 17/15 |

FOREIGN PATENT DOCUMENTS

| | | |
|---|---|---|
| CN | 100534730 | 9/2009 |
| CN | 103430510 | 12/2013 |
| CN | 104168260 | 11/2014 |
| CN | 104742126 | 7/2015 |
| CN | 105549487 | 5/2016 |
| CN | 105556404 | 5/2016 |
| DE | 19950869 | 4/2001 |
| DE | 102010039947 | 3/2012 |
| EP | 3026515 | 6/2016 |
| EP | 3267148 | 1/2018 |
| JP | H0579951 | 3/1993 |
| JP | H11085254 | 3/1999 |
| JP | 2004260380 | 9/2004 |
| JP | 2007518579 | 7/2007 |
| JP | 2008042458 | 2/2008 |
| JP | 2009171497 | 7/2009 |
| JP | 2010102549 | 5/2010 |
| JP | 2012166308 | 9/2012 |
| JP | 2015123538 | 7/2015 |
| JP | 2016001373 A * | 1/2016 |
| KR | 20160125942 | 11/2016 |
| WO | 2012028389 | 3/2012 |
| WO | 2013176381 | 11/2013 |
| WO | 2015128981 | 9/2015 |

OTHER PUBLICATIONS

"Office Action of China Counterpart Application", dated Sep. 15, 2020, with English translation thereof, p. 1-p. 20.
Office Action of Japan Counterpart Application, with English translation thereof, dated Mar. 23, 2021, pp. 1-8.
"Office Action of Korea Counterpart Application", dated May 27, 2020, with English translation thereof, p. 1-p. 11.
Office Action of Taiwan Counterpart Application, with English translation thereof, dated Feb. 4, 2020, pp. 1-9.
"Office Action of Korea Counterpart Application", dated Dec. 18, 2020, with English translation thereof, p. 1-p. 11.
"Search Report of Europe Counterpart Application", dated Jul. 2, 2019, p. 1-p. 10.

* cited by examiner

| FRAME #D1 | |
|---|---|
| Index | 1 |
| NUMBER OF PIECES OF DATA | 2 |
| DATA | STATE VALUE #1 |
| | STATE VALUE #2 |

FIG. 7A

| FRAME #D2 | |
|---|---|
| Index | 2 |
| NUMBER OF PIECES OF DATA | 3 |
| DATA | STATE VALUE #3 |
| | STATE VALUE #4 |
| | STATE VALUE #5 |

FIG. 7B

| FRAME #K1 | |
|---|---|
| Index | 1 |
| NUMBER OF PIECES OF DATA | 3 |
| DATA | MEASUREMENT VALUE #1 |
| | MEASUREMENT VALUE #2 |
| | MEASUREMENT VALUE #3 |

FIG. 7C

| FRAME #K2 | |
|---|---|
| Index | 2 |
| NUMBER OF PIECES OF DATA | 4 |
| DATA | MEASUREMENT VALUE #4 |
| | MEASUREMENT VALUE #5 |
| | MEASUREMENT VALUE #6 |
| | MEASUREMENT VALUE #7 |

FIG. 7D

MEASUREMENT SYSTEM AND METHOD THEREOF

CROSS-REFERENCE TO RELATED APPLICATION

This application claims the priority of Japan patent application serial no. 2018-036528, filed on Mar. 1, 2018. The entirety of the above-mentioned patent application is hereby incorporated by reference herein and made a part of this specification.

BACKGROUND

Technical Field

The disclosure relates to a measurement system and a method of the measurement system.

Description of Related Art

Systems in which a control device and various measurement devices are integrated through a network or the like have been proposed in the field of production as information and communication technologies (ICTs) have advanced in recent years.

For example, the specification of US Patent Application Publication No. 2008/0307125A1 (Patent Document 1: US Patent Application Publication No. 2008/0307125A1) discloses a configuration in which data is acquired in predetermined sampling periods and the data is transmitted to a control device in polling periods that are longer than the sampling periods (e.g., see FIGS. 1, 2, etc. of Patent Document 1).

However, it is necessary to set the number of sampling periods (measurement periods) to be a divisor of the number of polling periods (transmission periods) from the viewpoint of setting the number of measurement values to be transmitted to the control device to be constant every time. In addition, since the polling periods are longer than the sampling periods in Patent Document 1, all the acquired data is not transmitted to the control device.

The disclosure increases a degree of freedom for setting a measurement period and a transmission period of measurement values and provides a highly accurate measurement system and a method of executing the measurement system.

SUMMARY

According to one aspect of the disclosure, a measurement system comprises a control device and a measurement device that measures a measurement object in a first period and transmits measurement values obtained from the measurement device to the control device. The measurement device transmits the measurement values waiting to be transmitted and first additional information including information of the number of the measurement values waiting to be transmitted to the control device using first frames transmitted in a second period that is longer than the first period. The control device generates first time series data in which the measurement values are arranged in time series using the first additional information.

According to another aspect of the disclosure, a method is executed by a measurement system including a control device and a measurement device that transmits measurement values obtained by measuring a measurement object in a first period to the control device. The method includes transmitting, by the measurement device, the measurement values waiting to be transmitted and additional information including information of the number of the measurement values waiting to be transmitted to the control device using first frames transmitted in a second period that is longer than the first period; and generating, by the control device, time series data in which the measurement values are arranged in time series using the additional information.

BRIEF DESCRIPTION OF THE DRAWINGS

FIGS. 7A-7D are diagrams for describing configurations of frames.

DESCRIPTION OF THE EMBODIMENTS

An embodiment of the disclosure will be described below with reference to the appended drawings. In the following description, the same reference symbols are given to the same components. Names and functions thereof are the same. Therefore, detailed description thereof will not be repeated.

§ 1 Application Example

Figure 1:
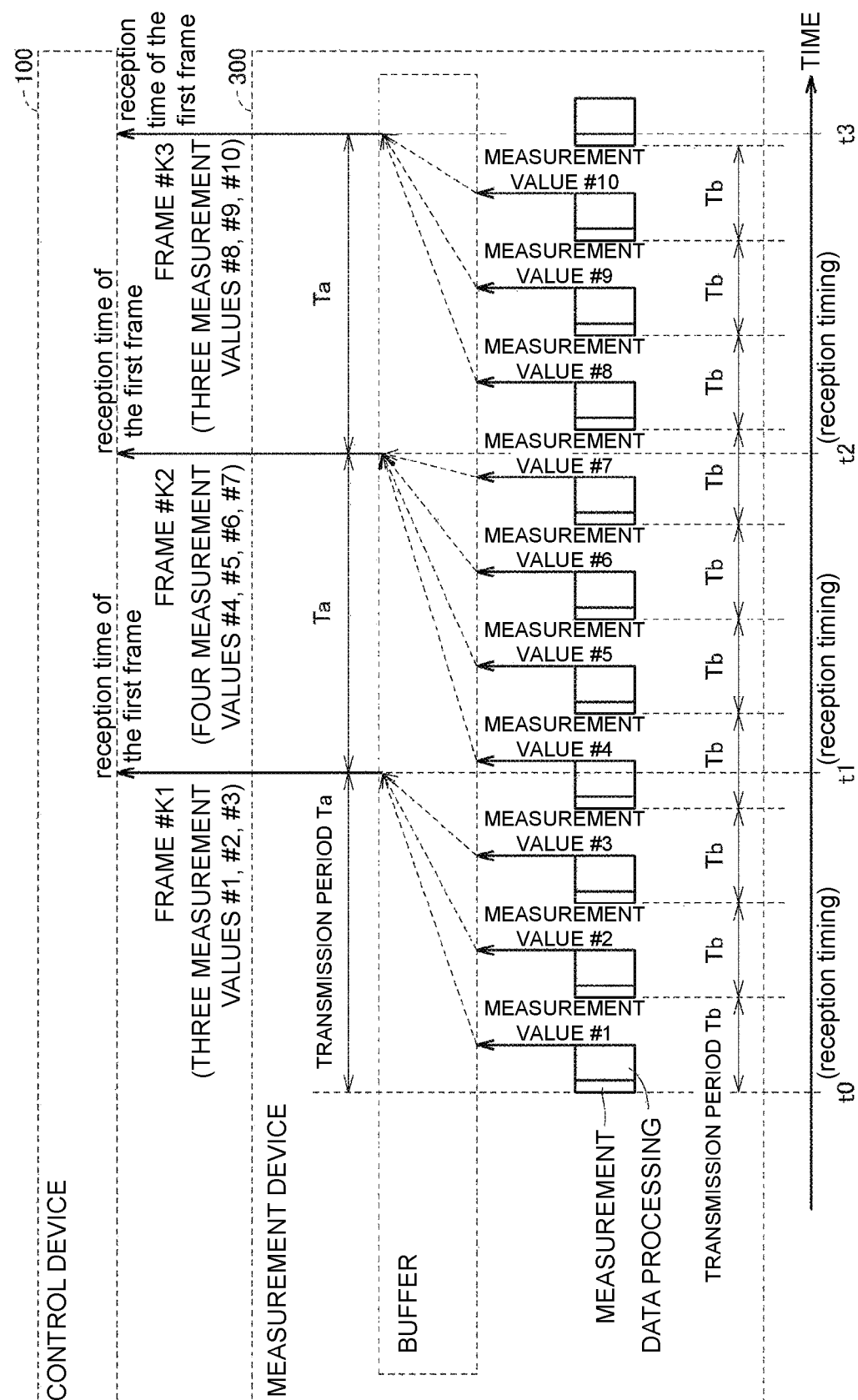
FIG. 1 is a diagram illustrating a schematic configuration of a measurement system.

FIG. 1 is a diagram illustrating a schematic configuration of a measurement system 1.

With reference to FIG. 1, the measurement system 1 has a control device 100 and a measurement device 300. The measurement device 300 measures a measurement object in measurement periods Tb (first periods) and transmits measurement values obtained from the measurement to the control device 100. Specifically, the measurement device 300 transmits measurement values waiting to be transmitted and additional information including information of the number of measurement values waiting to be transmitted to the control device 100 by using frames transmitted in transmission periods Ta (second periods) that are longer than the measurement periods Tb.

In the example of FIG. 1, measurement is executed in the measurement periods Tb from the time t0. Measurement values obtained from the measurement are temporarily stored in a buffer included in the measurement device 300. The measurement device 300 transmits the measurement values temporarily stored in the buffer (measurement values waiting to be transmitted) and information of the number of the measurement values (additional information) to the control device 100 in each of the transmission periods Ta. Note that the transmission periods Ta and transmission timings are managed by the control device 100.

The measurement device 300 transmits, for example, measurement values #1, #2, and #3 waiting to be transmitted and additional information including information of the number of the measurement values waiting to be transmitted (i.e., three) to the control device 100 by using a frame #K1 at the time t1, which is a timing of the transmission period Ta.

In addition, the measurement device 300 transmits measurement values #4, #5, #6, and #7 waiting to be transmitted and additional information including information of the number of the measurement values waiting to be transmitted (i.e., four) to the control device 100 using a frame #K2 at the time t2, which is a timing coming after the transmission period Ta elapses from the time t1.

Further, the measurement device 300 transmits measurement values #8, #9, and #10 waiting to be transmitted and transmits additional information including information of the number of the measurement values waiting to be transmitted (i.e., three) to the control device 100 using a frame #K3 at the time t3, which is a timing coming after the transmission period Ta elapses from the time t2.

In the example of FIG. 1, since the measurement periods Tb is not a divisor of the transmission periods Ta, the number of measurement values included in each frame is not constant as described above. On the other hand, if the measurement periods are set to be a divisor of the transmission periods, the number of measurement values included in each frame is constant.

The control device 100 generates time series data in which the plural measurement values are arranged in time series, by using the additional information. Specifically, as described above, the control device 100 receives the frame #K1, the frame #K2, the frame #K3, and the like in this order. Each of the frames includes not only the measurement values but also the additional information indicating the number of measurement values included in the frame.

The control device 100 can ascertain the number of the measurement values included in each of the frames #K1, #K2, and #K3 from the additional information. That is, the control device 100 can ascertain that the measurement values in the number indicated by the additional information have been transmitted from the measurement device 300 each time a frame is received. In addition, the control device 100 can reliably manage the measurement values transmitted from the measurement device 300.

Therefore, with the measurement system 1, a degree of freedom for setting the measurement period Tb and the transmission period Ta of the measurement values can be increased. In addition, with the measurement system 1, since all measurement values can be reliably managed, the measurement system 1 can obtain highly accurate time series data.

An example of a detailed configuration of the measurement system 1 that executes such a process will be described below.

§ 2 Example of Configuration

A. Example of Overall Configuration of Measurement System

Figure 2:
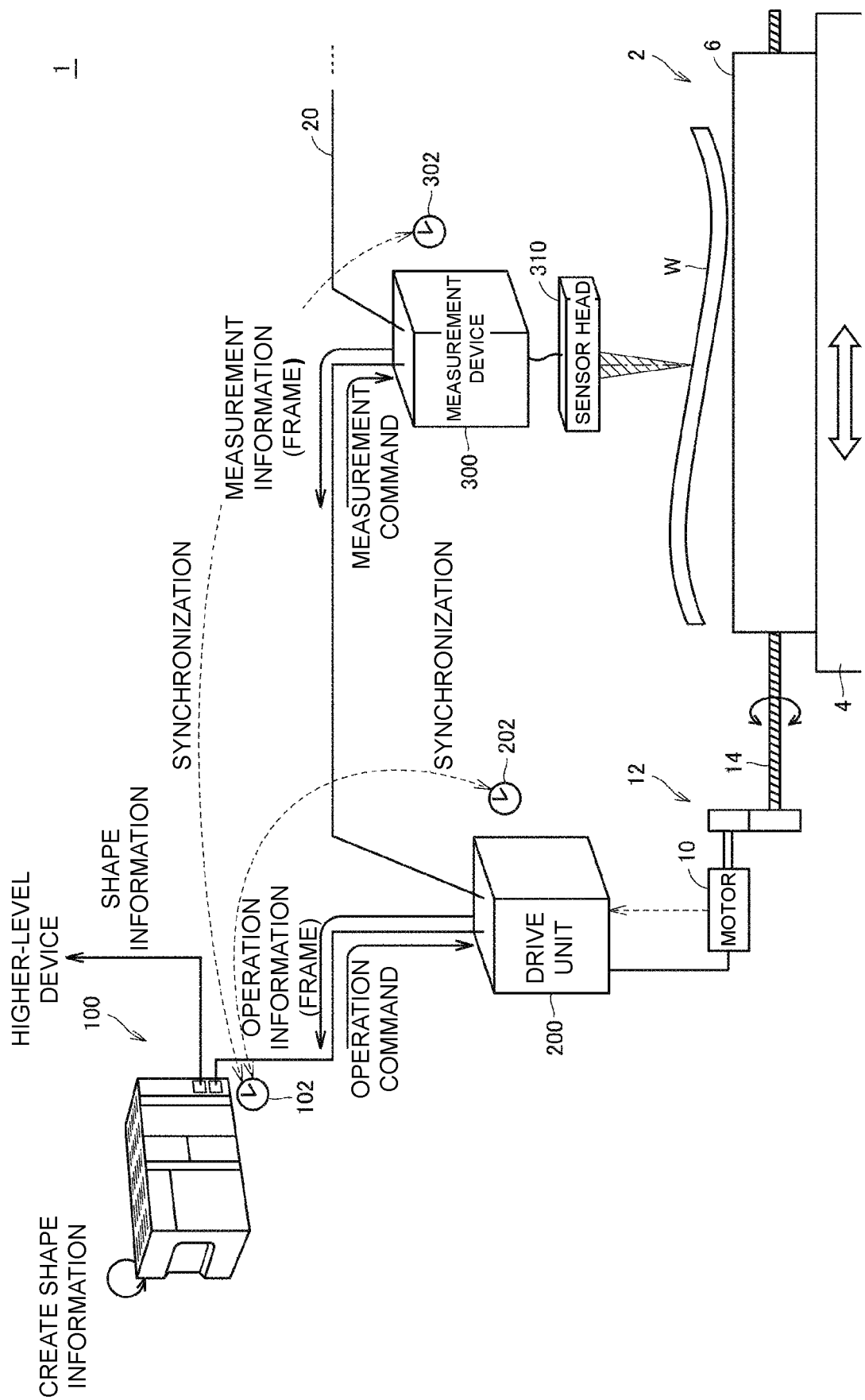
FIG. 2 is a schematic diagram illustrating an example of an overall configuration of the measurement system according to an embodiment.

First, an example of an overall configuration of the measurement system 1 according to the embodiment will be described. FIG. 2 is a schematic diagram illustrating an example of an overall configuration of the measurement system 1 according to the embodiment.

With reference to FIG. 2, the measurement system 1 according to the embodiment optically measures distances with respect to a plurality of measurement points on a measurement object (which will also be referred to as a "workpiece W" below) placed on an inspection device 2, so as to output shape information indicating a surface shape of the workpiece W, as an example.

In the present specification, "shape information" is information indicating a shape of the measurement object (workpiece W) and is a concept including a correspondence between an arbitrary position set on a measurement object and a measurement point with respect to the position.

More specifically, the measurement system 1 includes the control device 100, a drive unit 200 that is connected to the control device 100 via a field network 20, and the measurement device 300 as main constituent components. The measurement device 300 measures the workpiece W, which is a measurement object.

For the field network 20, a network for performing fixed period communication that ensures data arrival times is typically adopted. EtherCAT (registered trademark) or the like can be adopted as the network for performing such fixed period communication.

As an example, the control device 100 functions as a communication master on the field network 20. The communication master manages synchronization of timers between the devices connected to the field network 20 and communication schedules that regulate timings of data transmission and reception, and the like. That is, the control device 100, i.e., the communication master manages data communication on the field network 20 (the aforementioned transmission and reception of frames, etc.) and synchronization of timers.

The drive unit 200 and the measurement device 300 function as communication slaves that transmit and receive data on the field network 20 in accordance with instructions from the communication master.

More specifically, the control device 100 has a timer 102, the drive unit 200 has a timer 202, and the measurement device 300 has a timer 302. The timer 102 of the control device 100 generates a synchronization signal such as a reference clock, and thereby, the other timers 202 and 302 are synchronized with the timer 102. Thus, data transmission and reception timings can be managed at a common time between the devices connected to the field network 20.

As described above, the drive unit 200 and the measurement device 300 respectively have the synchronized timers. The drive unit 200 and the measurement device 300 can each have the synchronized timers by being connected to each other via the field network 20 that is a network with synchronized timings.

In this specification, a "time" refers to information specifying a certain point in the flow of time and can imply a timer value or a count value that is commonly used in the field network, for example, in addition to time with the normal meaning defined as hours, minutes, seconds, and the like. A "time" is basically managed by the timer of each device. In addition, "time information" includes information for specifying a "time" (e.g., a result obtained by encoding a "time" using any method, a time elapsed from a reference time, etc.), in addition to the "time" itself.

Generally, in a master-slave fixed period network, one or more devices may function as a communication master that manages synchronization of the timers. The communication master may not necessarily be the control device 100, and for example, one of the drive unit 200 and the measurement device 300 may function as the communication master.

The control device 100 is an arbitrary computer and may be implemented, typically, as a programmable logical controller (PLC). The control device 100 provides an operation command to the drive unit 200 connected via the field network 20 and receives information (including operation information) from the drive unit 200. In addition, the control device 100 provides a measurement command to the measurement device 300 and receives information (including measurement information) from the measurement device 300. The control device 100 generates shape information of the workpiece W by combining feedback responses from the drive unit 200 and the measurement device 300.

The operation information typically includes a plurality of state values. In addition, the measurement information typically includes a plurality of measurement values. The operation information and the measurement information typically include frames (frame data) as illustrated in FIG. 1.

Note that the control device 100 may execute some type of control calculation based on the generated shape information of the workpiece W and may transmit the generated shape information of the workpiece W to a higher-level device such as a manufacturing execution system (MES).

The drive unit 200 corresponds to a drive device that changes a relative position relation between the measurement device 300 and the workpiece W that is the measurement object. More specifically, the drive unit 200 drives a motor 10 that causes the inspection device 2 on which the workpiece W is placed to operate. For example, the drive unit 200 includes a servo driver, an inverter unit, and the like. According to an operation command from the control device 100, the drive unit 200 applies alternative current (AC) power or pulse power for driving the motor 10 and acquires an operation state of the motor 10 (e.g., a rotation position (phase angle), a rotation speed, a rotation acceleration, torque, and the like) and then transmits specified information to the control device 100 as the operation information. In addition, when an encoder (see the encoder 12 illustrated in FIG. 4) is mounted in the motor 10, an output signal from the encoder is inputted to the drive unit 200.

The motor 10 is driven to rotate and thereby changes a position of a stage 6 forming the inspection device 2. The stage 6 is movably placed on a base 4, for example, and is engaged with a ball screw 14. The motor 10 is mechanically coupled with the ball screw 14 via a speed reducer and thus rotational motions of the motor 10 are imparted to the ball screw 14. A relative position relation between the ball screw 14 and the stage 6 is changed in the extension direction of the ball screw 14 due to the rotation of the ball screw 14.

That is, by providing an operation command to the drive unit 200 from the control device 100, a position of the stage 6 of the inspection device 2 is changed and thus a position of the workpiece W placed on the stage 6 is changed accordingly.

The measurement device 300 is equivalent to a measurement unit that measures a displacement of the workpiece W. In the embodiment, a distance from a sensor head 310 that is electrically or optically connected to the measurement device 300 to a measurement point on a surface of the workpiece W is assumed as the displacement of the workpiece W. For example, the measurement device 300 may use an optical displacement sensor that optically measures a distance to the measurement point on the surface of the workpiece W. Specifically, the measurement device 300 irradiates measurement light from the sensor head 310 to the workpiece W, receives light generated from reflection of the aforementioned light irradiated on the workpiece W, and thereby measures the distance to the measurement point on the surface of the workpiece W. As an example, a triangulation optical displacement sensor or a coaxial-confocal optical displacement sensor may be used.

The measurement device 300 irradiates the measurement light to the workpiece W, receives the light reflected from the workpiece W, and thereby measures a characteristic value of the workpiece W. More specifically, the measurement device 300 adjusts a measurement timing (e.g., intensity or timing of measurement light irradiated to the workpiece W) and transmits measurement information including a measurement result computed from the received reflection light to the control device 100. As an example, the measurement device 300 adjusts a measurement timing and transmits measurement information including the measurement result computed from the received reflection light to the control device 100 in accordance with a measurement command from the control device 100 to impart time synchronization.

Note that the intensity and timing of the measurement light irradiated to the workpiece W may be adjusted by controlling a lighting time and a lighting timing of a light source that generates light or by controlling an exposure time and an exposure timing of an image sensor that receives the light reflected from the workpiece W.

In the present specification, "information indicating a position of the measurement object (workpiece W)" includes information indicating a position of the inspection device 2 that is mechanically connected to the workpiece W, the motor 10, or the like, in addition to information indicating a position of the workpiece W itself. That is, "information indicating a position of the measurement object (workpiece W)" includes arbitrary information that can directly or indirectly specify the position of the workpiece W. In addition, the number of dimensions of the information may have any value. Furthermore, the same applies to "information indicating a speed of the measurement object (workpiece W)" and "information indicating an acceleration of the measurement object (workpiece W)" as well.

The control device 100 adjusts the time relation between the operation information and the measurement information, and then generates information indicating a shape of the workpiece W (shape information).

B. Example of Hardware Configuration of Each Device Included in Measurement System Next, an example of a hardware configuration of each device included in the measurement system 1 according to the embodiment will be described.

(b1: Control Device)

Figure 3:
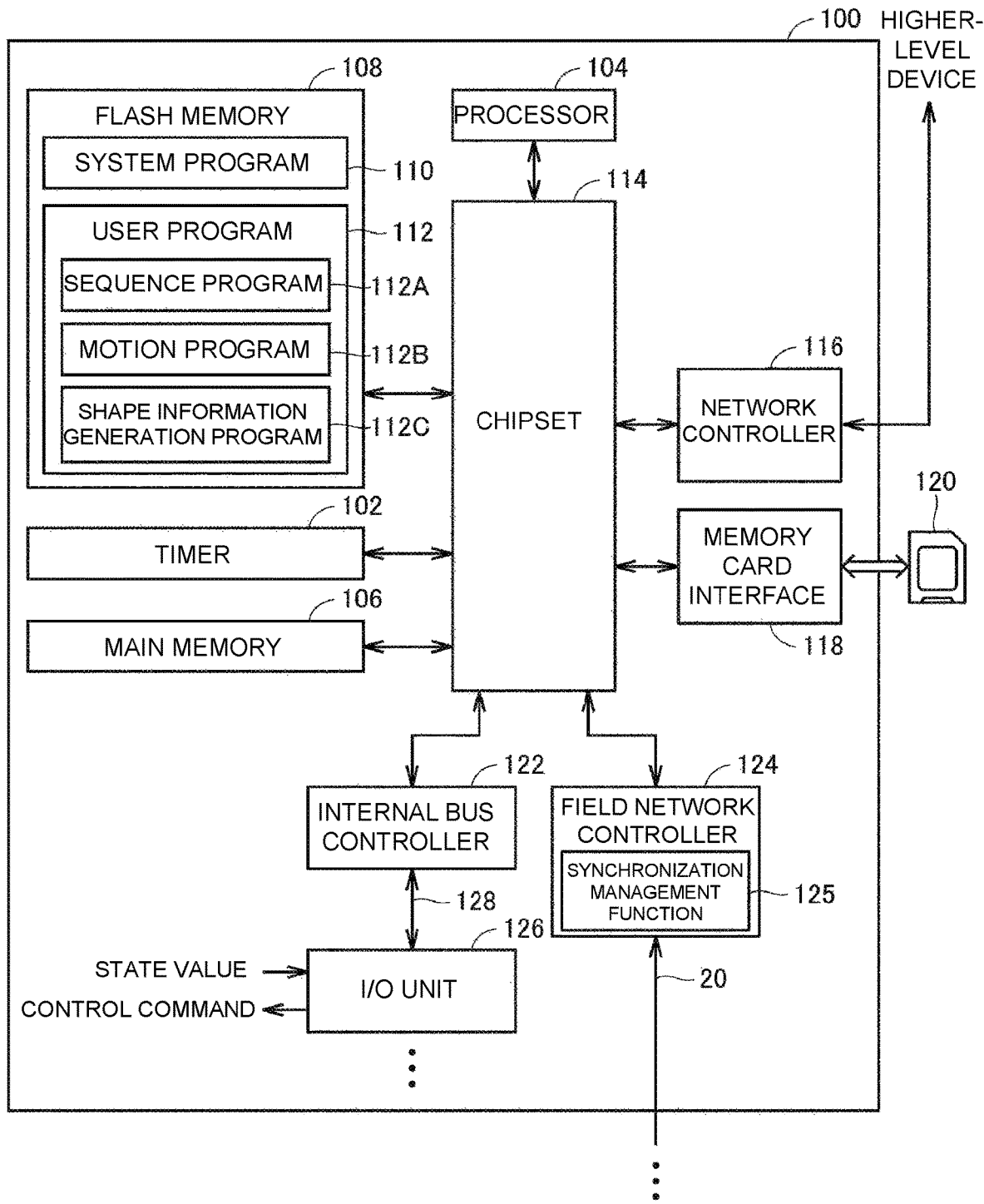
FIG. 3 is a schematic diagram illustrating an example of a hardware configuration of a control device included in the measurement system according to the embodiment.

FIG. 3 is a schematic diagram illustrating an example of a hardware configuration of the control device 100 included in the measurement system 1 according to the embodiment. With reference to FIG. 3, the control device 100 includes a processor 104, a main memory 106, a flash memory 108, a chipset 114, a network controller 116, a memory card interface 118, an internal bus controller 122, and a field network controller 124 in addition to the timer 102 that manages communication timings and the like of the field network 20.

The processor 104 is constituted by a central processing unit (CPU), a micro-processing unit (MPU), or the like and reads various programs stored in the flash memory 108, develops and executes the programs in the main memory 106, and thereby realizes control in accordance with a control object and various processes which will be described below.

The flash memory 108 stores a user program 112 to be executed by the control device 100 in addition to a system program 110 for providing basic functions as the control device 100.

The system program 110 is an instruction group for causing the control device 100 to execute processes necessary for executing the user program 112.

The user program 112 is an instruction group arbitrarily created in accordance with a control object or the like, and includes, for example, a sequence program 112A, a motion program 112B, and a shape information generation program 112C.

The chipset 114 realizes entire processes of the control device 100 by controlling the processor 104 and each device.

The network controller 116 exchanges data with a higher-level device and the like via a higher-level network.

The memory card interface 118 is configured such that a memory card 120, which is an example of a non-volatile storage medium, is detachable therefrom and can write data into the memory card 120 and read various kinds of data from the memory card 120.

The internal bus controller 122 is an interface that exchanges data with an I/O unit 126 mounted in the control device 100 via an internal bus 128.

The field network controller 124 is an interface that connects the drive unit 200 and other devices including the measurement device 300 on the network and exchanges data via the field network 20. The field network controller 124 includes a synchronization management function 125 as a function of the communication master on the field network 20.

The synchronization management function 125 computes a time shift between devices based on a time from each device (typically a count value outputted by the timer of each device) connected to the field network 20 and a time from the timer 102 and outputs a synchronization signal obtained by correcting the time shift to each device. In this way, the synchronization management function 125 synchronizes the timer 102 with the timer of the drive unit 200 and the timer of the measurement device 300.

Although FIG. 3 illustrates the example of the configuration in which necessary functions are provided when the processor 104 executes the programs, some or all of the provided functions may be implemented using a dedicated hard-wired circuit (e.g., an application specific integrated circuit (ASIC), a field-programmable gate array (FPGA), etc.). Alternatively, main parts of the control device 100 may be realized using hardware following a general-purpose architecture (e.g., an industrial controller based on a general-purpose computer). In this case, a plurality of operating systems (OS) for different uses may be executed in parallel and necessary applications may be executed on the OSs using a virtualization technology.

(b2: Drive Unit 200)

Figure 4:
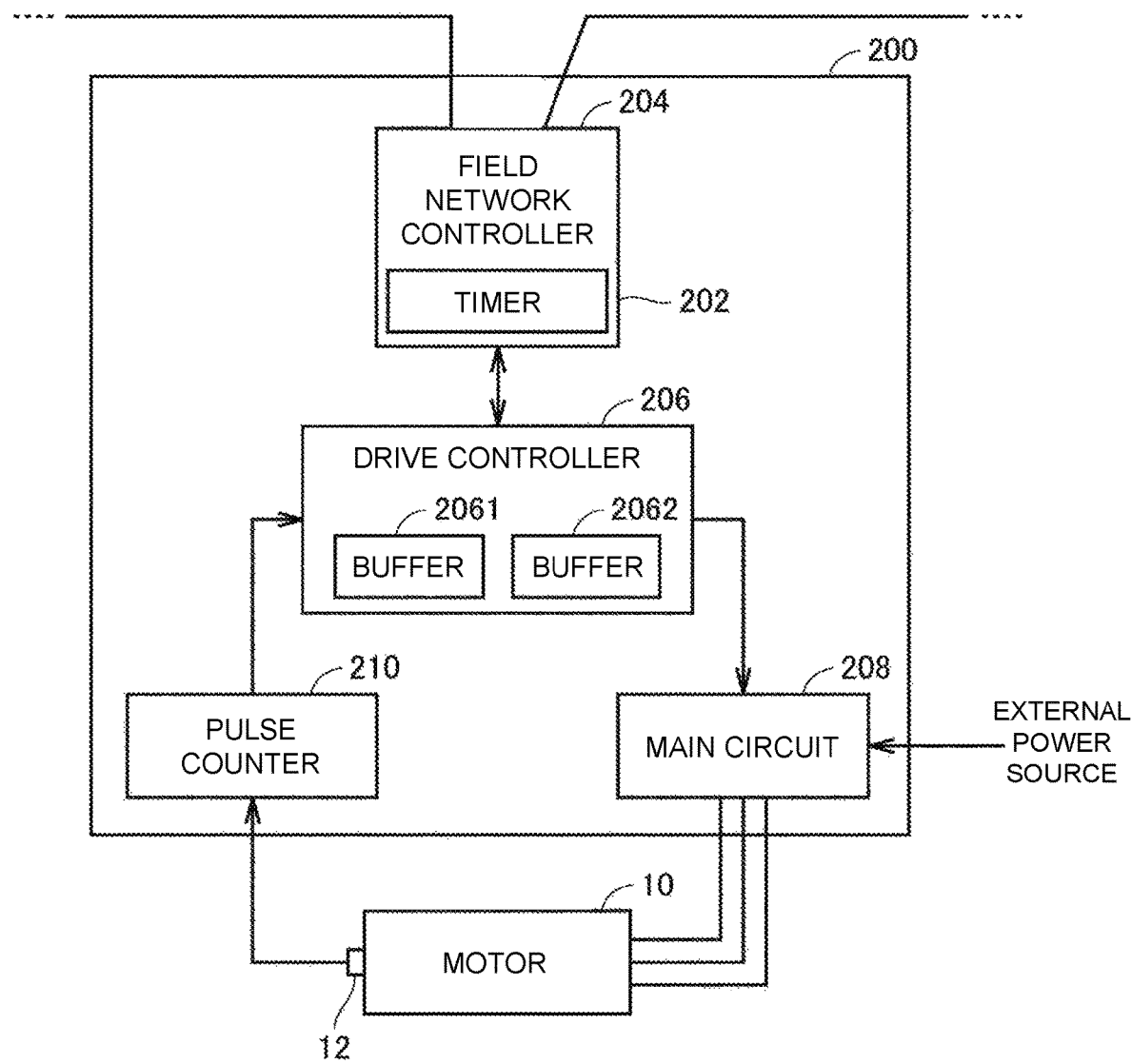
FIG. 4 is a schematic diagram illustrating an example of a hardware configuration of a drive unit included in the measurement system according to the embodiment.

FIG. 4 is a schematic diagram illustrating an example of a hardware configuration of the drive unit 200 included in the measurement system 1 according to the embodiment. With reference to FIG. 4, the drive unit 200 includes a field network controller 204 including the timer 202 that manages communication timings and the like on the field network 20, a drive controller 206, a main circuit 208, and a pulse counter 210.

The field network controller 204 is an interface that exchanges data with other devices including the control device 100 and the measurement device 300 via the field network 20.

The drive controller 206 generates a command value in accordance with predetermined calculation logic following an operation command from the control device 100. More specifically, the drive controller 206 has control calculation logic obtained by combining necessary control loops such as a position control loop, a speed control loop, and a torque control loop. The drive controller 206 computes an operation state of the target motor 10 using a count value counted by the pulse counter 210 and the like and outputs the result to the control device 100.

The drive controller 206 may be realized through hardware implementation in which necessary processes and functions are realized using a hard-wired circuit, such as ASIC or FPGA, in addition to software implementation in which necessary processes and functions are realized by causing the processor to execute programs.

The main circuit 208 includes, for example, a converter circuit and an inverter circuit and generates a predetermined current waveform or voltage waveform following a command from the drive controller 206 and provides the waveform to the connected motor 10.

The pulse counter 210 counts pulse signals from the encoder 12 mounted in the motor 10 and outputs the count value to the drive controller 206.

Note that the main circuit 208 and pulse counter 210 and the like may be appropriately altered in accordance with electrical or mechanical characteristics of the motor 10 to be driven.

The field network controller 204 and the drive controller 206 will be described below in detail. The drive controller 206 includes buffers 2061 and 2062.

The buffer 2061 maintains one of a reading state and a writing state. A state of the buffer 2061 is switched by a process of the field network controller 204. When the buffer 2061 is in the writing state, the buffer 2061 stores a state value outputted from the pulse counter 210. When the buffer 2061 is in the reading state, a state value temporarily stored in the buffer 2061 is read from the buffer 2061 following a reading command from the field network controller 204. The read state value is outputted by the field network controller 204 to the field network 20 in a state in which the value is stored in a frame.

The buffer 2062 maintains one of the reading state and the writing state. A state of the buffer 2062 is switched by a process of the field network controller 204. When the buffer 2062 is in the writing state, the buffer 2062 stores a state value output from the pulse counter 210. When the buffer 2062 is in the reading state, a state value temporarily stored in the buffer 2062 is read from the buffer 2062 in accordance with a reading command from the field network controller 204. The read state value is output by the field network controller 204 to the field network 20 in a state in which the value is stored in a frame.

The field network controller 204 acquires the state value stored in one of the buffer 2061 and the buffer 2062 which is in the reading state in each given communication period defined by the control device 100. The field network controller 204 outputs the acquired state value to the field network 20.

After the output of the state value, the field network controller 204 erases the state value stored in the buffer among the buffer 2061 and the buffer 2062 which is in the reading state. After executing reading of the state value, the field network controller 204 switches each of the states of the buffer 2061 and the buffer 2062 (a reading or writing state) into the opposite state (the writing state if the state before the execution of reading is the reading state).

(b3: Measurement Device 300)

Figure 5:
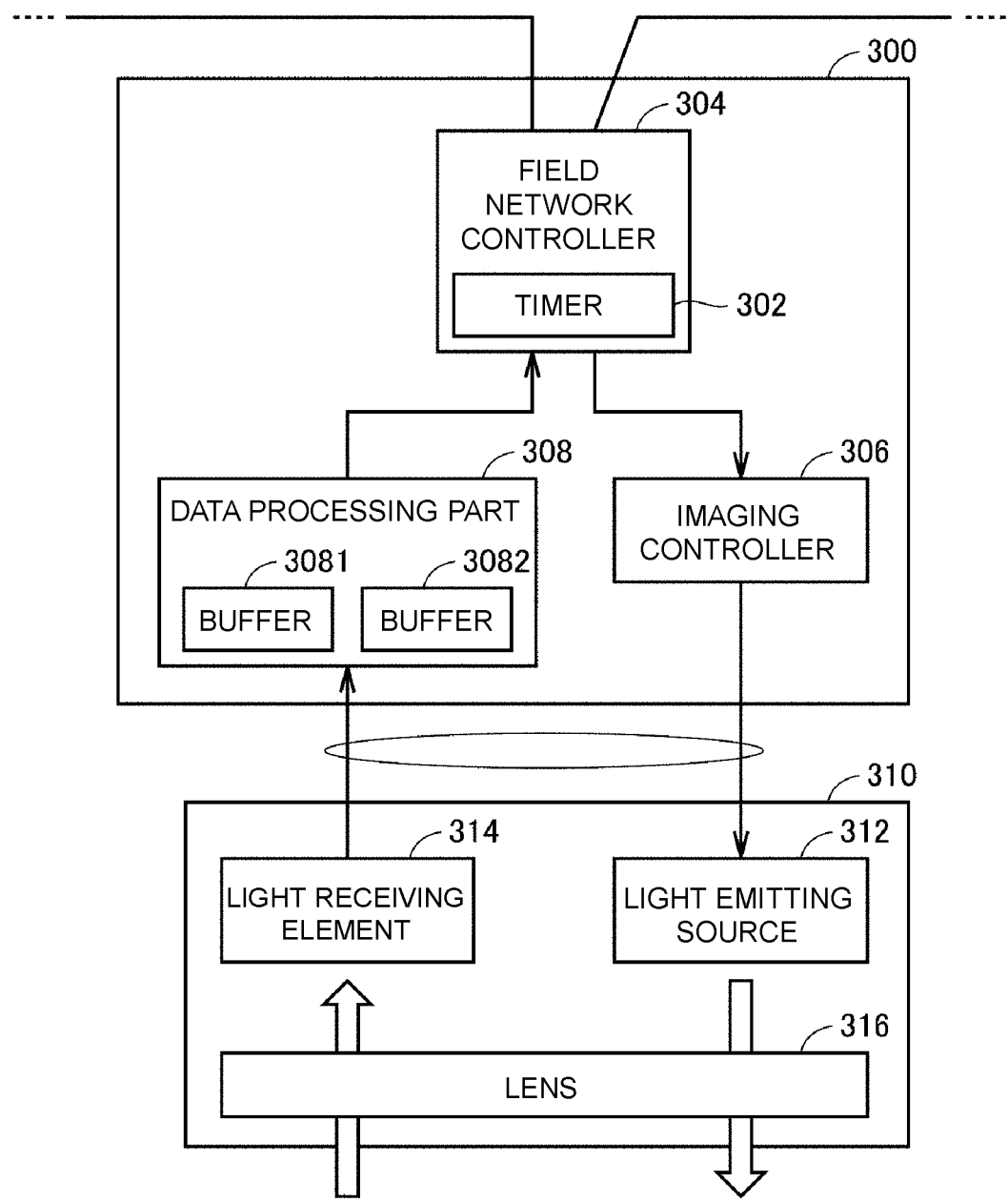
FIG. 5 is a schematic diagram illustrating an example of a hardware configuration of a measurement device included in the measurement system according to the embodiment.

FIG. 5 is a schematic diagram illustrating an example of a hardware configuration of the measurement device 300 included in the measurement system 1 according to the embodiment. With reference to FIG. 5, the measurement device 300 includes a field network controller 304 including the timer 302 that manages communication timings on the field network 20 and the like, an imaging controller 306, and a data processing unit 308.

The field network controller 304 is an interface that exchanges data with other devices including the control device 100 and the drive unit 200 via the field network 20.

The imaging controller 306 provides an irradiation command to the sensor head 310 in accordance with an operation command from the control device 100. The data processing unit 308 computes the distance to a measurement point on the surface of the workpiece W based on a light reception signal from the sensor head 310.

The sensor head 310 connected to the measurement device 300 includes a light emitting source 312, a light receiving element 314, and a lens 316.

The light emitting source 312 is a light source that is driven in accordance with a command from the imaging controller 306 and thereby generates a predetermined light beam, and is constituted by, for example, a white light emitting diode (LED), a semiconductor laser, or the like.

The light receiving element 314 is an element that receives light reflected from the target workpiece W and outputs a light reception signal thereof to the data processing unit 308, and is constituted by, for example, a light receiving element with a one-dimensional arrangement (a one dimensional complementary metal oxide semiconductor (COMS), etc.) or a light receiving element with a two-dimensional arrangement (a charge coupled device (CCD), etc.).

The lens 316 is an optical system that adjusts focal positions of measurement light irradiated from the sensor head 310 and the light reflected from the workpiece W, and the like.

Note that, since an optical configuration and an electrical configuration of the sensor head 310 are appropriately designed in accordance with the measurement principle, the embodiment is not limited to the configuration illustrated in FIG. 5.

The field network controller 304 and the data processing unit 308 will be described below in detail. The data processing unit 308 includes buffers 3081 and 3082.

The buffer 3081 maintains one of a reading state and a writing state. A state of the buffer 3081 is switched by a process of the field network controller 304. When the buffer 3081 is in the writing state, the buffer 3081 stores a measurement value output from the sensor head 310. When the buffer 3081 is in the reading state, a measurement value temporarily stored in the buffer 3081 is read from the buffer 3081 following a reading command from the field network controller 304. The read measurement value is outputted by the field network controller 304 to the field network 20 in a state in which the value is stored in a frame.

The buffer 3082 maintains one of the reading state and the writing state. A state of the buffer 3082 is switched by a process of the field network controller 304. When the buffer 3082 is in the writing state, the buffer 3082 stores a measurement value outputted from the sensor head 310. When the buffer 3082 is in the reading state, a measurement value temporarily stored in the buffer 3082 is read from the buffer 3082 in accordance with a reading command from the field network controller 304. The read measurement value is outputted by the field network controller 304 to the field network 20 in a state in which the value is stored in a frame.

The field network controller 304 acquires the measurement value stored in one of the buffer 3081 and the buffer 3082 which is in the reading state in each given communication period defined by the control device 100. The field network controller 304 outputs the acquired measurement value to the field network 20.

After the output of the measurement value, the field network controller 304 erases the measurement value stored in the buffer among the buffer 3081 and the buffer 3082 which is in the reading state. After executing reading of the measurement value, the field network controller 304 switches each of the states of the buffer 3081 and the buffer 3082 (a reading or writing state) into the opposite state (a writing state if the state before the execution of reading is a reading state).

C. Transmission and Configuration of Frames

Figure 6:
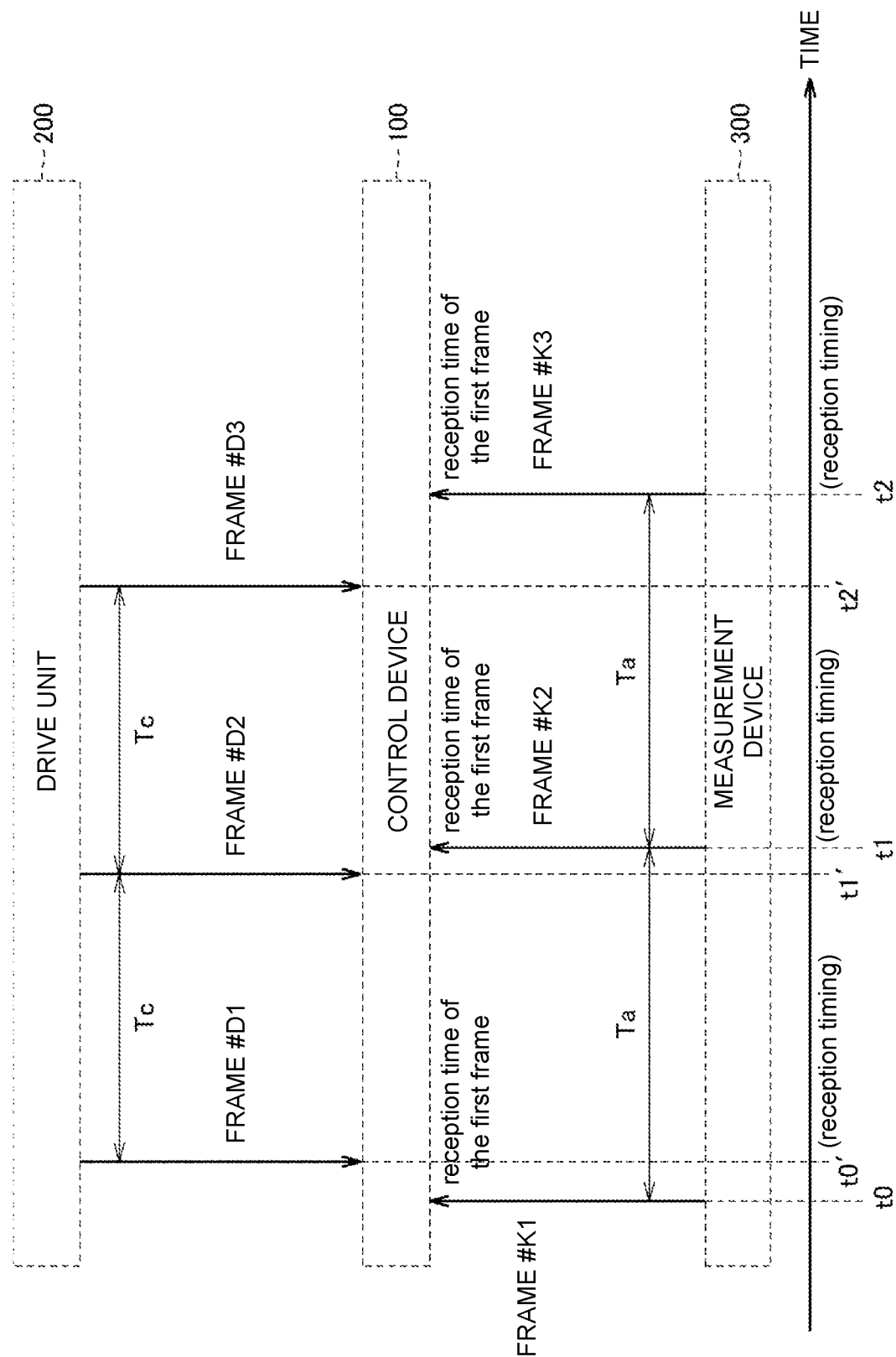
FIG. 6 is a diagram for describing transmission timings of frames.

FIG. 6 is a diagram for describing transmission timings of frames.

With reference to FIG. 6, after transmitting the frame #K1 at the time t0 to the control device 100, the measurement device 300 sequentially transmits frames in transmission periods Ta to the control device 100. In the example, the measurement device 300 transmits the frame #K2 at the time t1 and transmits the frame #K3 at the time t2 (t2=t1+Ta).

After transmitting a frame #D1 at a time t0' (t0'>t0) to the control device 100, the drive unit 200 sequentially transmits frames to the control device 100 in transmission periods Tc (Tc<Ta in the example). In the example, the drive unit 200 transmits a frame #D2 at the time t1' and transmits a frame #D3 at the time t2' (t2'=t1'+Tc).

FIGS. 7A-7D have diagrams for describing configurations of frames. Specifically, FIG. 7A is a diagram for describing a configuration of the frame #D1. FIG. 7B is a diagram for describing a configuration of the frame #D2. FIG. 7C is a diagram for describing a configuration of the frame #K1. FIG. 7D is a diagram for describing a configuration of the frame #K2.

With reference to FIGS. 7A and 7B, the drive unit 200 includes an index number which is identification information of the frame (identification information), information of the number of state values (the number of pieces of data) included in the frame, and the obtained state values (state values waiting to be transmitted) in each of the frames #D1 and #D2.

With reference to FIGS. 7C and 7D, the measurement device 300 includes an index number which is identification information of the frame, information of the number of measurement values (the number of pieces of data) included in the frame, and the obtained measurement values (measurement values waiting to be transmitted) in each of the frames #K1 and #K2.

By receiving the frames with the above-described configurations, the control device 100 can determine how many measurement values or state values are included in which frame.

Note that, although the configuration in which the index numbers of the frames transmitted by the drive unit 200 overlap with the index numbers of the frames transmitted by the measurement device 300 is exemplified in FIGS. 7A-7D, the embodiment is not limited thereto. The measurement system 1 may be configured such that a different index number is given to each frame so that index numbers of the frames transmitted by the drive unit 200 do not overlap with index numbers of the frames transmitted by the measurement device 300.

The control device 100 generates time series data of measurement values using the measurement values included in each of the frames #K1, #K2, #K3, and the like received from the measurement device 300. In addition, the control device 100 generates time series data of state values using the state values included in each of the frames #D1, #D2, #D3, and the like received from the drive unit 200.

Note that the index numbers (identification information) and the information of the number of measurement values included in the frames are an example of "additional information."

D. Control Structure

Figure 8:
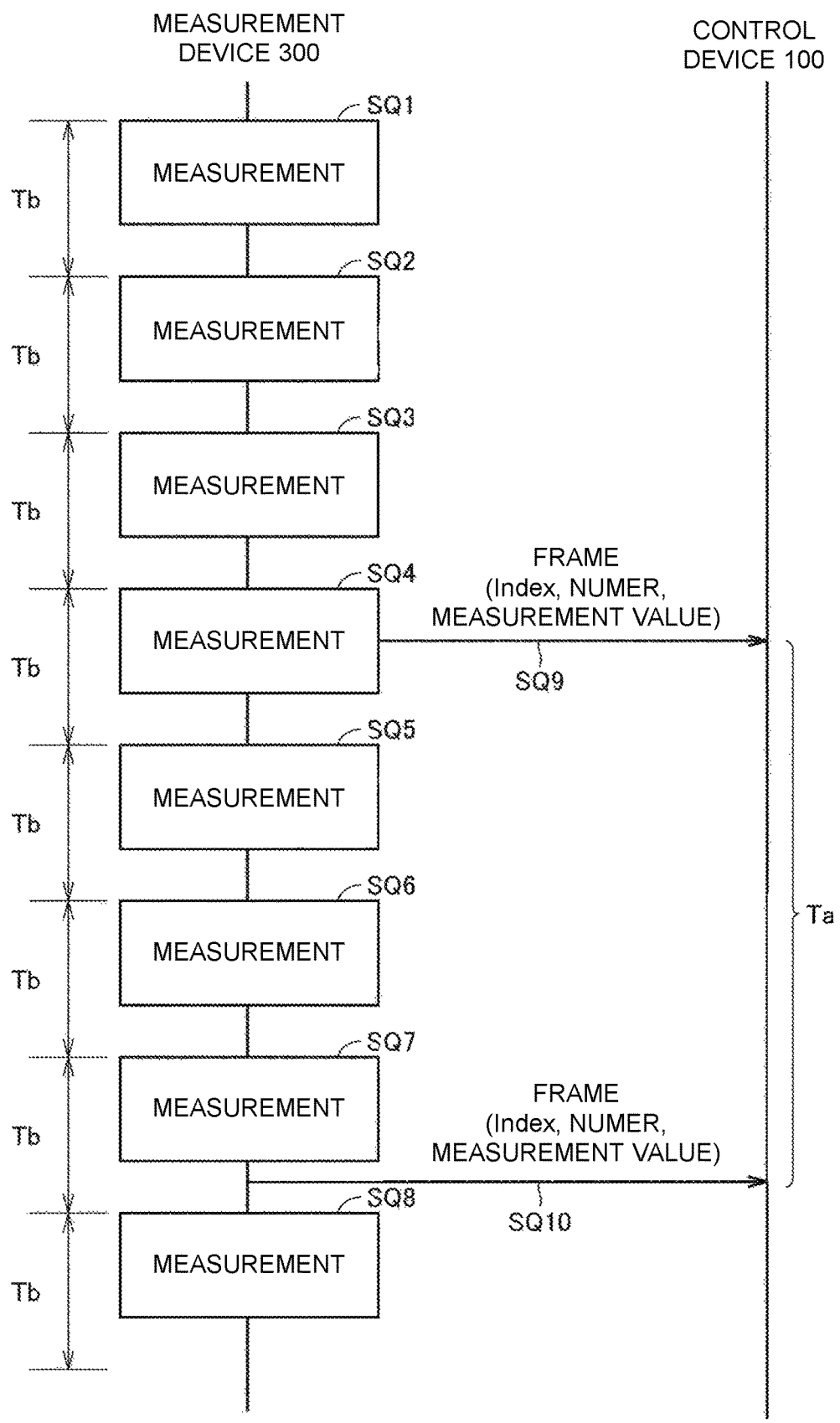
FIG. 8 is a sequence diagram for describing the flow of a process executed by the measurement device and the control device.

FIG. 8 is a sequence diagram for describing the flow of a process executed by the measurement device 300 and the control device 100.

With reference to FIG. 8, the measurement device 300 performs measurement in sequence SQ1. Then, measurement is repeated in the measurement periods Tb as indicated by sequences SQ2 to SQ8. The measurement device 300 transmits a frame to the control device 100 during the execution of measurement in sequence SQ4 based on the measurement by the control device 100 (sequence SQ9). This frame includes an index number, information of the number of state values included in the frame, and obtained state values (state values waiting to be transmitted) as illustrated in FIGS. 7A-7D.

After the frame is transmitted in the middle of sequence SQ4, the measurement device 300 repeats the transmission of a frame in the transmission period Ta. For example, the measurement device 300 transmits a frame to the control device 100 at a timing between the measurement in sequence SQ7 and the measurement in sequence SQ8 (sequence SQ10).

Figure 9:
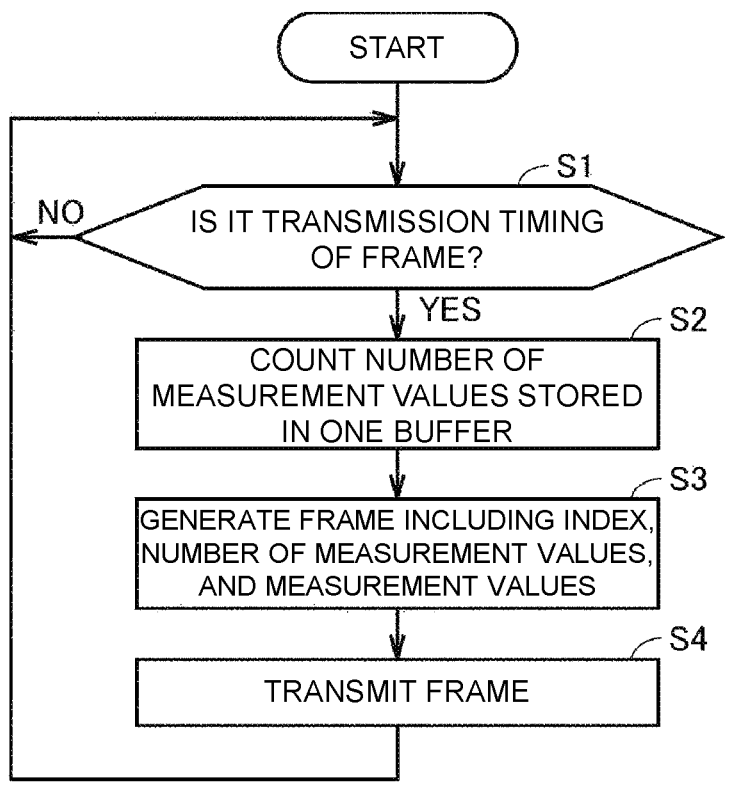
FIG. 9 is a flowchart for describing the flow of a frame transmission process executed by the measurement device.

FIG. 9 is a flowchart for describing the flow of a frame transmission process executed by the measurement device 300.

With reference to FIG. 9, the measurement device 300 determines whether it is a transmission timing of a frame in step S1. When it is determined that it is a transmission timing (YES in step S1), the measurement device 300 counts the number of measurement values stored in one buffer (measurement values waiting to be transmitted) among the two buffers 3081 and 3082 (see FIG. 5). When it is determined that it is not a transmission timing (NO in step S1), the measurement device 300 returns to step S1 of the process.

The measurement device 300 generates a frame including an index number, the number of measurement values, and the measurement values in step S3. The measurement device 300 transmits the generated frame to the control device 100 in step S4.

Figure 10:
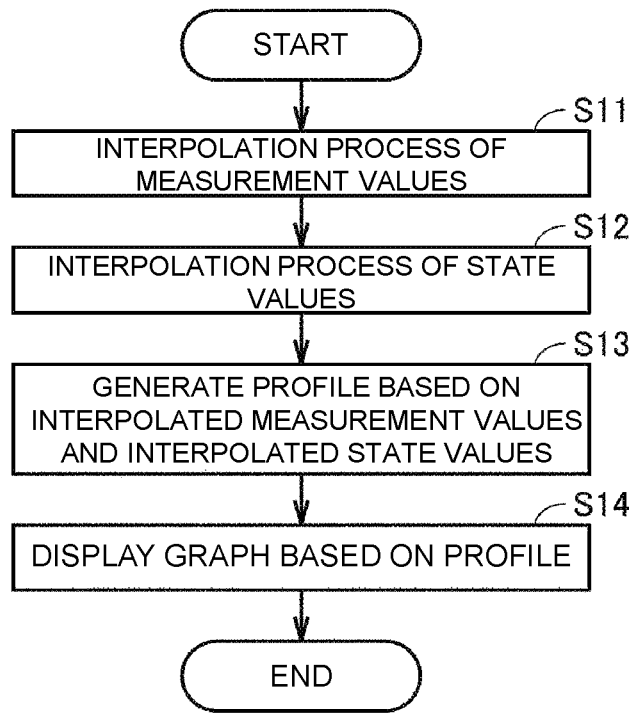
FIG. 10 is a flowchart for describing the flow of a process executed by the control device.

FIG. 10 is a flowchart for describing the flow of a process executed by the control device 100.

With reference to FIG. 10, the control device 100 executes an interpolation process on time series data of measurement values based on the measurement values received from the measurement device 300 in step S11. The control device 100 executes an interpolation process on times series data of state values based on the state values received from the drive unit 200 in step S12.

The interpolation processes are processes for obtaining measurement values and state values at least at the same timings (times). For example, it is assumed that acquisition times of the measurement values are t0, t0+Tb, t0+2Tb, t0+3Tb, and the like, and acquisition times of the state values are t0', t0'+Td t0'+2Td, t0'+3Td, and the like. Note that Td is the measurement period of a state value and is shorter than the transmission period Tc (see FIG. 6). In addition, it is assumed that t0<t0'<t0+Tb is satisfied for the sake of convenience in description.

In this case, the control device 100 generates measurement values at least at times t0', t0'+Td, t0'+2Td, t0'+3Td, and the like in the interpolation process performed using measurement values. As an example, the control device 100 generates the measurement value (interpolation value) of the time t0' using the measurement value of time t0 and the measurement value of the time t0+Tb. In addition, the control device 100 generates measurement values at least at times t0+Tb, t0+2Tb, t0+3Tb, and the like in the interpolation process performed using state values.

In step S13, the control device 100 generates a profile based on the measurement values and state values (information indicating the shape of the workpiece W) using the measurement values received from the measurement device 300, the state values received from the drive unit 200, and the measurement values and the state values obtained from the interpolation processes. In step S14, the control device 100 causes an external display such as a programmable display device to display a graph based on the generated profile (FIG. 11C).

Details of the interpolation processes may be predetermined in the control device 100 or the measurement device 300 and the drive unit 200 may provide instructions of interpolation processing methods for each of the values to the control device 100. That is, the measurement system 1 may be configured such that the measurement device 300 provides an instruction of an interpolation method for the time series data of the measurement values to the control device 100 and the drive unit 200 provides an instruction of an interpolation method for the time series data of the state values to the control device 100. According to this configuration, it is not necessary to predetermine the interpolation method for the time series data of the measurement values and the interpolation method for the time series data of the state values in the control device 100.

E. User Interface

Figure 11A:
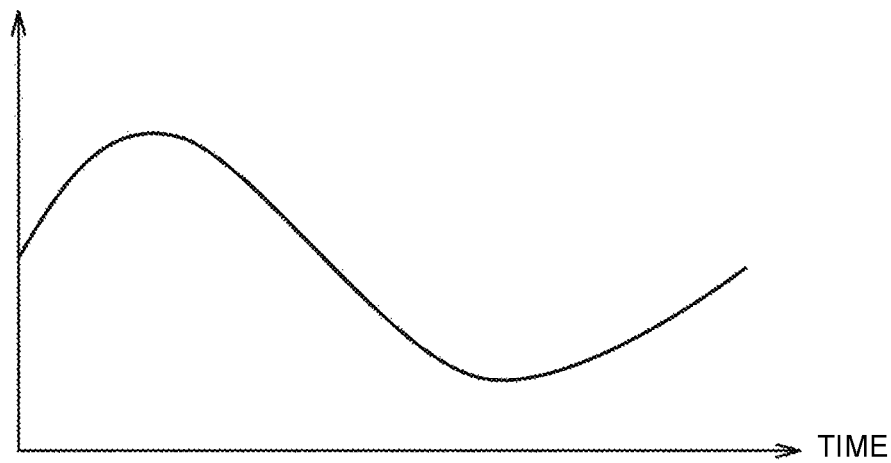
FIGS. 11A-11C are diagrams for describing images displayed on an external display.
Figure 11B:
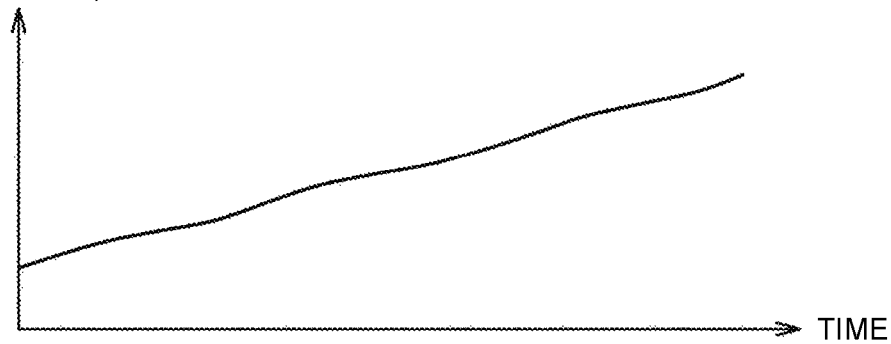
Figure 11C:
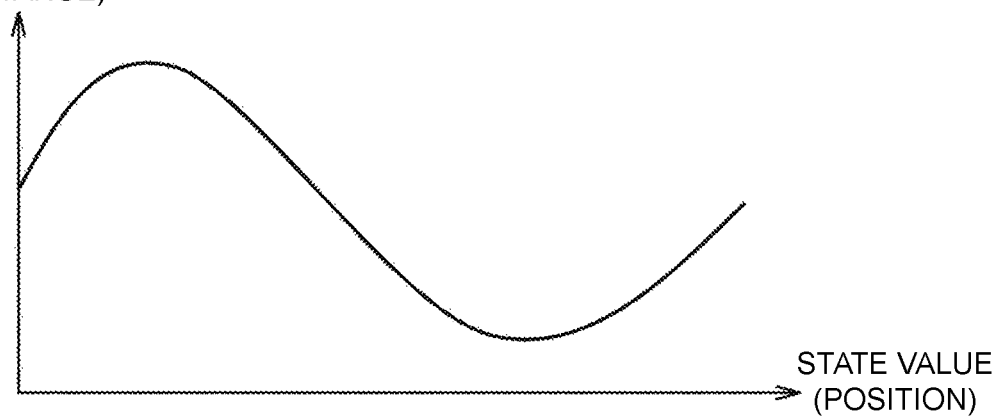

FIGS. 11A-11C illustrates diagrams for describing images displayed on an external display. FIG. 11A is a graph showing temporal change of measurement values. FIG. 11B is a graph showing temporal change of state values. FIG. 11C is a graph showing a profile based on the measurement values and state values.

With reference to FIG. 11A, the control device 100 displays a graph showing temporal change of measurement values using measurement values received from the measurement device 300 and measurement values obtained from the interpolation process on the basis of a received predetermined user operation.

With reference to FIG. 11B, the control device 100 displays a graph showing temporal change of state values using state values received from the measurement device 300 and state values obtained from the interpolation process on the basis of another received predetermined user operation.

With reference to FIG. 11C, the control device 100 displays a graph showing a profile based on the measurement values and the state values based on another received user operation. When a user of the measurement system 1 checks the graphs, the user can ascertain change of the measurement values with respect to measurement positions of the workpiece.

F. Modified Example (1) Process with Respect to Fluctuation of Frames

In a case in which time information of each of the measurement periods Tb and Td is computed using frame arrival times by the control device 100, the accuracy in acquisition time information can deteriorate due to fluctuation of frames.

Thus, the control device 100 collects and manages information of frame shifts. Accordingly, the control device 100 can obtain highly accurate time information of each measurement result that is not affected by the fluctuation of frames.

Figure 12:
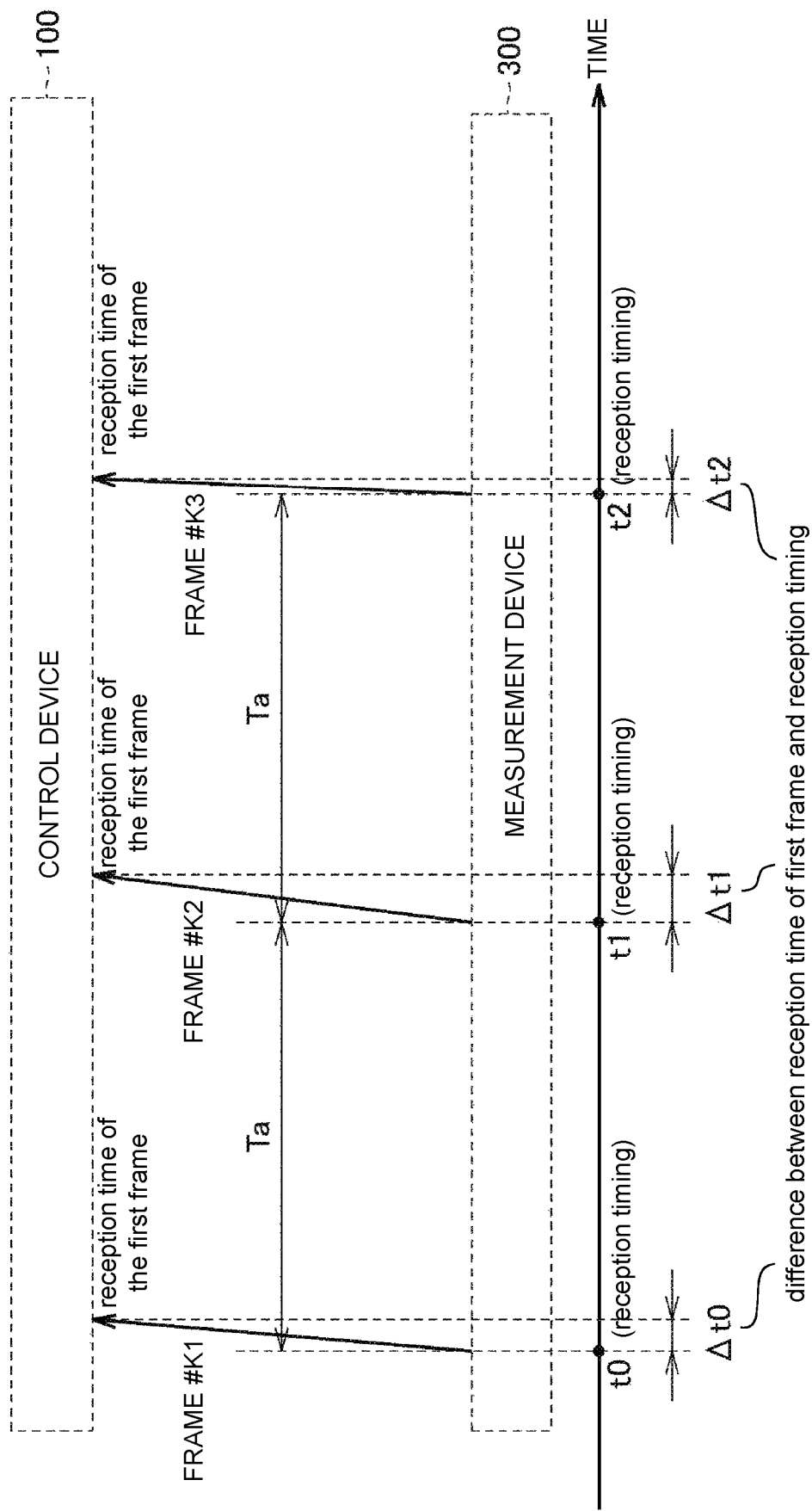
FIG. 12 is a diagram for describing fluctuation of frames.

FIG. 12 is a diagram for describing fluctuation of frames. With reference to FIG. 12, the reception time of the frame #K1 for the control device 100 is assumed to be delayed by $\Delta t0$ from the frame arrival reference time (t0 in this example) due to fluctuation of frames. Likewise, the reception times of the frames #K2 and #K3 are assumed to be each delayed by $\Delta t1$ and $\Delta t2$ from the frame arrival reference times (t1 and t2 in this example).

In this case, the control device 100 performs a process of advancing time information (time) of measurement values #1, #2, and #3 included in the frame #K1 (see FIG. 7C) by $\Delta t0$. Likewise, the control device 100 performs a process of advancing time information of measurement values #4, #5, #6, and #7 included in the frame #K2 (see FIG. 7D) by $\Delta t1$. The control device 100 performs a process of advancing time information of each measurement value included in the frame #K3 by $\Delta t2$.

Specifically, the control device 100 computes information of the times at which the measurement device 300 obtains the measurement values based on the measurement period Tb and the reception times of the frames #K1, #K2, #K3, and the like. The control device 100 computes the differences between the reception times of corresponding frames and the reference reception timings (reference times) of the frames ($\Delta t0$, $\Delta t1$, $\Delta t2$, and the like). The control device 100 corrects the computed time information with the differences.

In addition, the control device 100 computes information of the times at which the drive unit 200 obtains the state values based on the measurement period Td and the reception times of the frames #D1, #D2, #D3, and the like. The control device 100 computes the differences between the reception times of corresponding frames and the reference reception timings (reference times) of the frames. The control device 100 corrects the computed time information with the differences.

With this configuration, highly accurate time information of each measurement result that is not affected by the fluctuation of the frame can be obtained as described above.

(2) Transmission of Time Information

Although the configuration in which, when the drive unit 200 and the measurement device 300 transmit the state values and the measurement values to the control device 100, the drive unit 200 and the measurement device 300 do not notify the control device 100 of the time information indicating the measurement timings of the values has been exemplified above, the embodiment is not limited thereto.

The drive unit 200 and the measurement device 300 may notify the control device 100 of the time information indicating the measurement timings as follows.

In the measurement system 1, time information associated with a state value transmitted from the drive unit 200 to the control device 100 is added to the state value. This time information indicates a timing at which an associated operation value is acquired, or the like. The drive unit 200 associates information indicating a position of the workpiece W with time information from the timer indicating the timing at which the information indicating the position is acquired as described above and outputs the associated information as a state value.

Likewise, time information associated with a measurement value transmitted from the measurement device 300 to the control device 100 is added to the measurement value. This time information indicates, for example, the timing at which the associated measurement value is acquired, the timing at which measurement light for acquiring the associated measurement value is radiated, or the like. The measurement device 300 associates the measurement value acquired by measuring the workpiece W with the time information from the timer indicating the timing at which the measurement value is acquired as described above and outputs the associated information as a measurement value.

The control device 100 adjusts the time relation between state values and measurement values using time information associated with each of the state values and measurement values and then generates shape information of the workpiece W. More specifically, the control device 100 computes a position associated with time information included in the measurement values on the basis of one or a plurality of state values and generates a profile of the workpiece W based on a combination of the computed position and the measurement values associated with common time information.

(3) Display Process

The control device 100 may cause an external display or the like to display not only a graph showing the profile but also various kinds of data such as time series data of the measurement values and time series data of the state values based on a user instruction.

In addition, the control device 100 may update the graph in real time in the middle of measurement. Alternatively, the control device 100 may cause the graph to be displayed at the time at which measurement of one measurement object is completed.

G. Supplement

[1] A measurement system 1 comprises a control device 100 and a measurement device 300 that measures a measurement object W in a first period (measurement periods Tb) and transmits measurement values obtained from the measurement device to the control device 100. The measurement device 300 transmits the measurement values waiting to be transmitted and first additional information including information of the number of the measurement values waiting to be transmitted to the control device 100 using first frames (frames #K1, #K2, #K3, and the like) transmitted in a second period (transmission periods Ta) that is longer than the first period (the measurement periods Tb). The control device 100 generates first time series data in which the measurement values are arranged in time series using the first additional information.

[2] The first additional information further includes identification numbers of the first frames.

[3] The control device 100 computes time information at which the measurement device 300 obtains the measurement values based on the first period (the measurement period Tb) and the reception times of the first frames, computes differences between the reception times of the first frames and reception timings that are references of the first frames, and corrects the calculated information of the times with the differences.

[4] The measurement system further includes a drive device 200 that changes a relative position relation between the measurement device 300 and the measurement object W, the drive device 200 has a function of measuring an operation state of the drive device 200 in third periods and transmits state values obtained from a measurement of the drive device to the control device 100. The drive device 200 further uses second frames (frames #D1, #D2, #D3, and the like) transmitted in a fourth period that is longer than the third period to transmit the state values waiting to be transmitted and second additional information including information of the number of the state values waiting to be transmitted to the control device 100 using second frames (frames #D1, #D2, #D3, and the like) transmitted in a fourth period that is longer than the third period. The control device (100) uses the second additional information to generate second time series data in which the state values are arranged in time series.

[5] The control device 100 generates a profile showing a correspondence relationship of the measurement values and the state values in time series based on the first time series data and the second time series data.

[6] The control device 100 performs a data interpolation process on each of the first time series data and the second time series data and uses the interpolated first time series data and the interpolated second time series data to generate the profile.

[7] The measurement device 300 provides an instruction of a data interpolation method for the first time series data to the control device 100.

[8] A method of a measurement system 1 including a control device 100 and a measurement device 300 that transmits measurement values obtained by measuring a measurement object in a first period (measurement periods Tb) to the control device 100. The method comprises transmitting, by the measurement device 300, the measurement values waiting to be transmitted and additional information including information of the number of the measurement values waiting to be transmitted to the control device 100 using first frames (frames #K1, #K2, #K3, and the like) transmitted in a second period (transmission periods Ta) that is longer than the first period (the measurement period Tb); and generating, by the control device 100, series data in which the measurement values are arranged in time series using the additional information.

H. Other Configurations

According to one aspect of the disclosure, a measurement system comprises a control device and a measurement device that measures a measurement object in a first period and transmits measurement values obtained from the measurement device to the control device. The measurement device transmits the measurement values waiting to be transmitted and first additional information including information of the number of the measurement values waiting to be transmitted to the control device using first frames transmitted in a second period that is longer than the first period. The control device generates first time series data in which the measurement values are arranged in time series using the first additional information.

According to the above-described configuration, it is possible to increase a degree of freedom for setting a measurement period and a transmission period of the measurement values and provide a highly accurate measurement system.

The first additional information further includes identification numbers of the first frames. According to the above-described configuration, the control device can determine how many measurement values or state values are included in which frame.

The control device computes time information at which the measurement device obtains the measurement values based on the first period and reception times of the first frames. The control device computes differences between the reception times of the first frames and reception timings that are references of the first frames. The control device corrects the calculated information of the times with the differences.

According to the above-described configuration, it is possible to obtain highly accurate time information of each measurement result that is not affected by fluctuation of the frames.

The measurement system further includes a drive device that changes a relative position relation between the measurement device and the measurement object. The drive device has a function of measuring an operation state of the drive device in a third period and transmitting state values obtained from a measurement of the drive device to the control device. The drive device uses second frames transmitted in a fourth period that is longer than the third period to transmit the state values waiting to be transmitted and second additional information including information of the number of the state values waiting to be transmitted to the control device. The control device uses the second additional information to generate second time series data in which the state values are arranged in time series.

According to the above-described configuration, it is possible to increase a degree of freedom for setting a measurement period and a transmission period of state values and provide a highly accurate measurement system.

The control device generates a profile showing a correspondence relationship in time series between the measurement values and the state values based on the first time series data and the second time series data.

According to the above-described configuration, a user of the measurement system can ascertain a precise shape of the measurement object.

The control device performs a data interpolation process on each of the first time series data and the second time series data. The control device uses the interpolated first time series data and the interpolated second time series data to generate the profile.

According to the above-described configuration, a user of the measurement system 1 can ascertain a more precise shape of the measurement object.

The measurement device provides an instruction on a data interpolation method for the first time series data to the control device.

According to the above-described configuration, it is not necessary to predetermine an interpolation method for time series data of the measurement values in the control device.

According to another aspect of the disclosure, a method is executed by a measurement system including a control device and a measurement device that transmits measurement values obtained by measuring a measurement object in a first period to the control device. The method includes transmitting, by the measurement device, the measurement values waiting to be transmitted and additional information including information of the number of the measurement values waiting to be transmitted to the control device using first frames transmitted in a second period that is longer than the first period; and generating, by the control device, time series data in which the measurement values are arranged in time series using the additional information.

According to the above-described method, it is possible to increase a degree of freedom for setting a measurement period and a transmission period of measurement values and provide a highly accurate measurement system.

Accordingly, as effects of the disclosure, the degree of freedom for setting a measurement period and a transmission period of measurement values may be increased, so as to provide a highly accurate measurement system.

It should be noted that all matters described in the embodiment disclosed herein are illustrative and not limitative. The scope of the present disclosure is clarified based on the claims, not the description of the embodiment above, and it is intended that the disclosure covers modifications and variations provided that they fall within the scope of the following claims and their equivalents.

What is claimed is:

1. A measurement system, comprising:
   an inspection device, having a stage on which a measurement object is placed, the stage is configured to move in a first direction and a second direction;
   a motor that drives the stage to move in the first direction and the second direction;
   an encoder mounted to the motor;
   a control device, comprising a processor;
   a measurement device, having a buffer and measuring the measurement object in every first period to obtain measurement values, wherein the measurement values are temporarily stored in the buffer,
   wherein the measurement device transmits the measurement values stored in the buffer and first additional information, including information of a number of the measurement values, to the control device by using first frames transmitted at every second period, the second period is longer than the first period, and
   the control device uses the first additional information to generate first time series data in which the measurement values are arranged in time series; and
   a drive device configured to drive the motor to change a relative position between the measurement device and the measurement object, the drive device is controlled by the control device,
   wherein the drive device has a function of acquiring a rotation position of the motor based on an output signal from the encoder in every third period to obtain position values that are temporarily stored in a buffer of the drive device,
   uses second frames that are transmitted in every fourth period longer than the third period to transmit the position values that are stored in the buffer of the drive device and second additional information including information of a number of the position values to the control device, and
   the control device uses the second additional information to generate second time series data in which the position values are arranged in time series.

2. The measurement system according to claim 1, wherein the first additional information further comprises identification numbers of the first frames.

3. The measurement system according to claim 1, wherein the control device computes time information from a timer of the control device and a timer of the measurement device, wherein the time information includes times at which the measurement device obtains the measurement values based on the first period and which is indicated by the timer of the measurement device and reception times of the first frames which is indicated by the timer of the measurement device,
   computes differences between the reception times of the first frames and reception timings that are references of the first frames by a count value of the timer of the control device and a count value of the timer of the measurement device, and
   corrects the computed time information with the differences.

4. The measurement system according to claim 2, wherein the control device computes time information from a timer of the control device and a timer of the measurement device, wherein the time information includes times at which the measurement device obtains the measurement values based on the first period and which is indicated by the timer of the measurement device and reception times of the first frames which is indicated by the timer of the measurement device,
   computes differences between the reception times of the first frames and reception timings that are references of the first frames by a count value of the timer of the control device and a count value of the timer of the measurement device, and
   corrects the computed time information with the differences.

5. The measurement system according to claim 1, wherein the control device generates a profile showing a correspondence relationship in time series between the measurement values and the position values based on the first time series data and the second time series data.

6. The measurement system according to claim 5, wherein the control device performs a data interpolation process on each of the first time series data and the second time series data, and
   uses the interpolated first time series data and the interpolated second time series data to generate the profile.

7. The measurement system according to claim 6, wherein the measurement device provides an instruction of a data interpolation method for the first time series data to the control device.

8. A method for a measurement system, including a control device comprising a processor; an inspection device, having a stage on which a measurement object is placed, the stage is configured to move in a first direction and a second direction; a motor that drives the stage to move in the first direction and the second direction; an encoder mounted to the motor; a measurement device having a buffer; and a drive device configured to drive the motor to change a relative position between the measurement device and the measurement object, the drive device is controlled by the control device, the method comprising:

measuring the measurement object in every first period to obtain measurement values, wherein the measurement values are temporarily stored in the buffer;

transmitting, by the measurement device, the measurement values stored in the buffer and additional information including information of a number of the measurement values to the control device using first frames transmitted at every second period, the second period is longer than the first period;

generating, by the control device, time series data in which the measurement values are arranged in time series by using the additional information; and changing, by a drive device driving the motor, a relative position between the measurement device and the measurement object, the drive device is controlled by the control device, wherein the drive device has a function of acquiring a rotation position of the motor based on an output signal from the encoder in every third period to obtain position values that are temporarily stored in a buffer of the drive device, uses second frames that are transmitted in every fourth period longer than the third period to transmit the position values that are stored in the buffer of the drive device and second additional information including information of the number of the position values to the control device; and using, by the control device, the second additional information to generate second time series data in which the position values are arranged in time series.

9. The method according to claim 8, wherein the first additional information further comprises identification numbers of the first frames.

10. The method according to claim 8, further comprising: computing, by the control device, time information from a timer of the control device and a timer of the measurement device, wherein the time information includes times at which the measurement device obtains the measurement values based on the first period and which is indicated by the timer of the measurement device and reception times of the first frames which is indicated by the timer of the measurement device, computing differences between the reception times of the first frames and reception timings that are references of the first frames by a count value of the timer of the control device and a count value of the timer of the measurement device, and correcting the computed time information with the differences.

11. The method according to claim 10, further comprising:

generating, by the control device, a profile showing a correspondence relationship in time series between the measurement values and the position values based on the first time series data and the second time series data.

12. The method according to claim 11, further comprising:

performing, by the control device, a data interpolation process on each of the first time series data and the second time series data, and using, by the control device, the interpolated first time series data and the interpolated second time series data to generate the profile.

13. The method according to claim 11, further comprising:

providing, by the measurement device, an instruction of a data interpolation method for the first time series data to the control device.

* * * * *